United States Patent [19]
Leibinger

[11] 3,958,479
[45] May 25, 1976

[54] MACHINE TOOL HAVING OPERATION CONTROL

[75] Inventor: Berthold Leibinger, Gerlingen, Germany

[73] Assignee: Firma Trumpf Maschinen A.G., Switzerland

[22] Filed: Jan. 24, 1975

[21] Appl. No.: 543,938

[30] Foreign Application Priority Data
Jan. 31, 1974 Germany............................ 2404485

[52] U.S. Cl................................... 83/209; 83/225; 83/230; 83/237; 83/282; 83/916
[51] Int. Cl.²...................... B23D 27/00; B26D 5/20
[58] Field of Search ............ 83/209, 221, 222, 225, 83/230, 237, 257, 282, 916

[56] References Cited
UNITED STATES PATENTS
3,563,123   2/1971   Leibinger.......................... 83/916 X

*Primary Examiner*—Willie G. Abercrombie
*Attorney, Agent, or Firm*—McGlew and Tuttle

[57] ABSTRACT

A machine tool which is operable on a workpiece, particularly a stamping or nibbling machine, comprises a movable electrically conductive work tool which is connected in a circuit along with a workpiece. The circuit includes a relay having a switch which is closable to energize a control device such as a drive motor for the feed of the workpiece. The relay is controlled by a contact which is effected when the tool contacts the workpiece to energize the relay and, for example, to open the contact in the control circuit, to stop the control operation. The relay advantageously includes a spring to return this contact switch to a closed position.

8 Claims, 3 Drawing Figures

MACHINE TOOL HAVING OPERATION CONTROL

FIELD AND BACKGROUND OF THE INVENTION

This invention relates in general to the construction of a machine having a movable tool and, in particular, to a new and useful machine, such as a nibbler, or stamping machine, or the like, having an operation control circuit which is operable upon contact of the movable tool with the workpiece.

DESCRIPTION OF THE PRIOR ART

The present invention relates to a machine which includes a reciprocating machining tool, particularly a stamping or nibbling machine, in which at least a part of the tool which comes into contact with the workpiece, and a part of the respective surface of the workpiece are generally electrically conductive. In a stamping or nibbling machine where the application of the invention is primarily intended, the stamping or nibbling punch is usually made of steel and the workpiece to be machined is normally a metal sheet. At the present time, machines are known wherein the tool operation is started and stopped either manually or by some timing or other similar control mechanism.

SUMMARY OF THE INVENTION

The invention provides an operating machine which includes a reciprocating tool member wherein both the workpiece and the reciprocating tool are employed to operate a control circuit for controlling the operation or a related operation.

In accordance with the invention, the reciprocating tool is connected electrically to one terminal of an electric circuit, and the workpiece is connected to another. The electrical circuit includes a normally closed contact switch of a relay or solenoid which is actuated to open the switch when the workpiece is contacted by the tool. The relay advantageously includes a biasing spring for returning the contact to a closed position to operate some control function, such as a feed drive motor, when the tool and the workpiece are not in contact. The control may also comprise an auxiliary device, etc. The invention makes it possible, for example, to count and check the number of strokes of the tool and to also limit the strokes provided that a corresponding desired value is supplied and a controller is attached to the control circuit for comparing the desired and actual values and for operating a switching off mechanism. The signal taken from the motion of the tool can also be utilized for any other purpose, for example, the switching on and off of an auxiliary device, particularly a workpiece advance drive device.

In a preferred embodiment of the invention, in which the machine tool is provided with an electric drive motor for the workpiece advance, the relay comprises a normally closed contact which is connected in the circuit of the drive motor for the feed of the workpiece. At the moment the electric connection between the tool and the workpiece is interrupted, the relay is energized, whereupon a built-in spring closes the normally closed contact and thereby also the circuit of the drive motor for the workpiece advance. After a certain advance takes place, the circuit of the drive motor is interrupted again. With a delay-free stopping of the advance drive motor and the workpiece, the advance must be stopped not later than at the instant the tool contacts the workpiece in the theoretically optimum circumstance.

In order to prevent damaging of the workpiece and of the machine tool, the drive motor for the workpiece advance is provided with a time-controlled, contact-breaking device. In consequence, at an interruption of the electric connection between the tool and the workpiece, the drive motor is switched on through the relay and runs over a period of time which is predetermined by the time-controlled, contact-breaking device. This period of time must be shorter than the time necessary for the remaining back stroke and a corresponding working stroke portion of the tool up to the new contact with the workpiece. As far as sheet metals or workpieces of different thicknesses which are operated upon, such as by stamping, nibbling, etc., the period during which the contact-breaking device is switched on is determined by the thickest of the sheets or workpieces which are to be machined.

For an optimum machining of sheets having different thicknesses, it is particularly advantageous if the duration of the on period of the contact-breaking device is adjustable. Then, the time can always be adjusted so that the advance drive motor is switched off shortly before the tool performing the working stroke contacts the workpiece and, taking into account the run-out time of the motor, the workpiece is surely stopped prior to the contact of the tool. With this construction, and provided there is a predetermined number and frequency of strokes, it is possible when machining thinner sheets, to obtain a longer period of advance of the workpiece. In nibbling, this means that with thin sheets, the advance is longer, and with thick sheets, the advance is shorter, so that in each case, the nibbling machine is utilized in its most optimal manner. Even if, for technological reasons, it is not desirable to have an excessive advance, a longer period of running of the drive motor advancing the workpiece is advantageous because, in such a case, the acceleration and the advance forces can be reduced.

Another feature of the invention is that the drive motor for the workpiece advance is provided with an adjustable contact-breaking device so that the start of the on period is determined by the stroke position of the tool at the instant of separation of the electrically conductive parts of the tool and the workpiece from each other. An auxiliary mechanism is further provided for detecting this stroke position of the tool or the corresponding position of the tool drive, and this position is transmitted as a desired value for the on period to the contact-breaking device. The end of the on period is determined by a fixed distance on the free tool end from the workpiece. In an individual machine, the length of the working stroke and the equal length of the back stroke is predetermined and may be adjustable. Starting from such a predetermined length, the design has the following effect: As soon as the electrically conductive connection between the workpiece and the tool is interrupted, the stroke position attained at this moment by the tool performing the backstroke is detected, and this position coresponds to a definite position of the tool drive, for example, of an eccentric or crank of the drive. The instant at which this signal is produced coincides with the closing of the contacts of the switching relay, and it represents the start of the on period of the contact-breaking device, that is, the period during which this device is switched on. Thus, up to reaching the upper dead center position, a period of time lapses depending exclusively on the instant of interruption of the electric connection between the workpiece and the tool. Since, as already explained, a certain time still elapses between the switching off of the drive motor for the workpiece advance and the final stopping of the workpiece, the portion of the one period of the motor starting with the beginning of the working stroke must be chosen so that it is shorter than the corresponding portion during the backstroke. In other words, if, for example, the electrical connection between the workpiece and the tool is interrupted at the moment at which the free tool end disengages from the workpiece, this moment represents the start of the on period of the drive motor for the workpiece advance. Thereupon, the tool performs its backstroke, and subsequently, its working stroke. At a small distance above the workpiece, the one period of the drive motor for the workpiece advance expires so that in spite of a certain run-out period, the workpiece is already standing still at the time it is contacted by the tool.

In another preferred embodiment of the invention, the tool is provided with a detachable clamping piece, particularly a clamping sleeve which is engageable and disengageable by means of a control device. The mechanism is switched on upon interruption of the electrical connection between the tool and the workpiece, and switched off, as soon as the clamping sleeve, which is moved in the direction of the working stroke, reaches a position at a predetermined distance from the fixed stop. At the same time, the circuit of the drive motor for the workpiece advance is interrupted. In its engaged position, the clamping sleeve is movable in the backstroke direction against the action of a spring.

The above-described preferred embodiment operates as follows:

Assuming that the entire workpiece, and also the punch or the entire tool, is electrically conductive, so that the electric connection between the tool and the workpiece is interrupted at the moment at which the punch disengages from the workpiece, the clamping device for the clamping sleeve is actuated and, at the same time as the circuit of the drive motor for the workpiece advance, it is closed so that for the remaining back stroke, the clamping sleeve is moved upwardly along with the tool. The clamping device may be actuated, for example, by the same relay which controls the circuit of the drive motor for the workpiece advance. During this back stroke of the tool, the clamping sleeve tensions the spring which may be mounted concentrically on the tool and is designed as a compression spring. During the workpiece stroke, the spring is relieved, and the clamping sleeve approaches the fixed stop. As soon as a predetermined distance of the clamping sleeve from the stop is reached, the circuit of the drive motor for the workpiece advance is interrupted, and the clamping device disengages the clamping sleeve from the tool. The tool continues its working stroke and comes into contact with the working piece and, since the workpiece is already stopped despite a certain run-out period of the drive motor, the following working operation of the machine tool can be performed without any risk. The spring pushes the disengaged sleeve from the position reached at the release of the clamping device down into contact with the fixed stop. With the emersion of the tool from the workpiece, a new working cycle begins. By providing suitable arrangements, for example, a corresponding circuitry, it is possible to obtain a condition so that at the interruption of the electrical connection between the tool and the workpiece, all of the open contacts in the circuit of the drive motor for the workpiece advance will be closed again.

It is further provided that the tool or the fixed stop comprises a proximity switch and the respective other element comprises a switch member associated therewith, or it is designed as such a member. The proximity switch must operate so that its contacts open as soon as the clamping piece or sleeve has reached a position at a predetermined distance. Inversely, its contacts must not close before the clamping piece has moved away from the fixed stop through the same distance. Nevertheless, at the back stroke of the tool, this small period of time can be easily suppressed by providing a suitable circuitry, choosing a suitable switch, or without a contact-free switching, by appropriately designing the actuator.

In another advantageous embodiment of the invention, the distance between the clamping sleeve and the fixed stop which is determinative for the releasing of the clamping device is made selectable, or the sensitivity of response of the proximity switch is made adjustable. This permits an optimum adjustment of the entire device and, thereby, a maximum advance time for the workpiece and, in addition, the use of another drive for the workpiece advance which has a different run-out characteristic.

Accordingly, it is an object of the invention to provide an operating machine which includes a reciprocating machining tool, such as a stamping or nibbling machine, which is connected so that a control operation is determined by contact and separation of the tool with the workpiece and wherein the control is advantageously effected through a control circuit having a first contact engageable with the work-piece and a second contact engageable with the tool so that the circuit is closed when the workpiece is engaged by the tool.

A further object of the invention is to provide a control circuit for operating a reciprocating tool in respect to its contact with a workpiece which includes a circuit having an open contact which is closed by engagement of the tool with the workpiece and which includes a relay having a normally closed contact which is opened when the tool contacts the workpiece so as to disengage the control operation which, for example, may be a feed motor for driving the workpiece and wherein the relay includes a return spring for closing the contact when the workpiece is moved out of engagement with the tool.

A further object of the invention is to provide a device operable by reciprocation of a machine tool against a workpiece which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference should be had to the accompanying drawing and descriptive matter in which there are illustrated preferred embodiments of the invention.

DESCRIPTION OF THE PREFERRED EMBODIMENT

Figure 1:
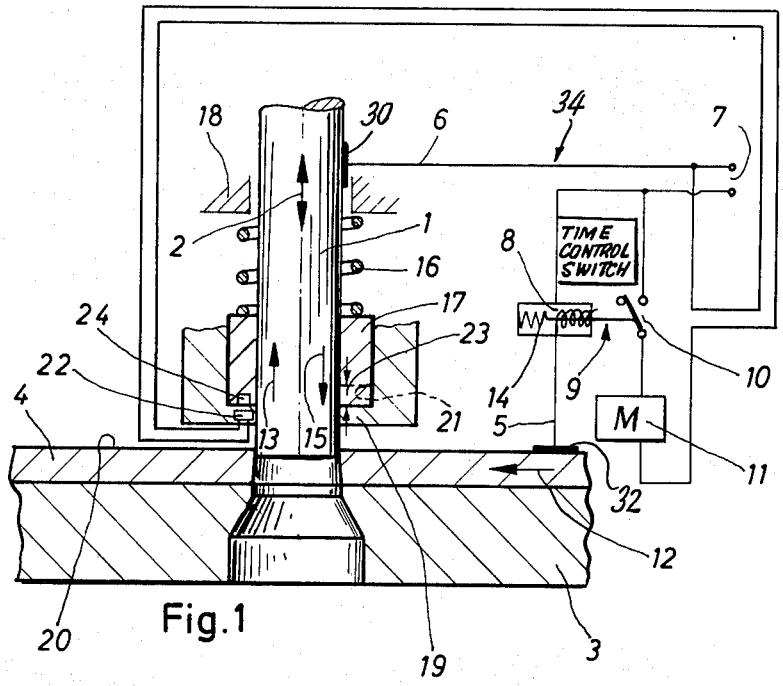
FIG. 1 is a diagrammatical partial section view of an operating machine which includes a reciprocating punch which is engageable with a workpiece and operated by contact and disengagement with the workpiece in accordance with the invention.

Referring to the drawing in particular, the invention embodied therein, comprises a nibbling machine, which includes a reciprocating punch 1, which is movable upwardly and downwardly in the directions indicated by the double-arrow 2. The punch 1 cooperates with a die 3 which is supported in a suitable manner below the punch. The workpiece 4, which is to be machined, comprises a plane metal sheet having an exterior or interior border which is to be nibbled. Both nibbling punch 1 and workpiece 4 are made of an electrically conductive material.

In accordance with the invention, the punch and the workpiece are connected by contact means in the form of a first contact 30 and a second contact 32 which are engageable with the tool 1 and the workpiece 4, respectively, to an electrical circuit, generally designated 34.

The electrical circuit 34 includes the contacts 30 and 32 which are connected through connecting lines 6 and 5 to a current source 7. Line 5 is connected to a coil 8 of a relay, generally designated 9. Relay 9 includes a normally closed contact 10 which is connected in the circuit of a control device, such as a drive motor 11 for the feed of the workpiece. Drive motor 11 includes means for advancing the workpiece, for example, in the direction of the arrow 12 only when punch 1 is not in contact with the workpiece. Drive motor 11 is advantageously provided with a switch control for switching the workpiece motor 11 on and off and/or for regulating the speed of operation thereof.

The electrical circuit 34 is such that, as long as the workpiece 4 and the tool 1 are in contact, the circuit is closed through coil 8 of relay 9. When this occurs, the coil causes the opening of the switch 10 to interrupt the circuit to the control device 11.

During the back stroke of punch 1 in the direction of the arrow 13, the electrical circuit is interrupted and, thereby, coil 8 is de-energized, so that a spring 14 of relay 9 urges contact 10 back into its normally closed position, which is not shown in the drawing. In this closed position of contact 10, current will flow to drive motor 11 unless the separate control element therefor is switched off. This circuit is again closed as soon as punch 1, in the course of its working stroke in a direction of arrow 15, re-engages the surface of workpiece 4. In such an instance, relay 9 pulls contact 10 to an open position again and the drive motor is again stopped so that the workpiece comes to a standstill. Suitable accommodation may be made for the run-out of the drive motor or for effecting its immediate disconnection from the feed if desired.

A helical compression spring 16 is concentrically arranged around the tool or punch 1, and it acts between a clamping sleeve 17 and a fixed element 18. Sleeve 17 is adapted to be clamped to or disengaged from the punch in an appropriate manner. In the present example, clamping device 17 is connected so as to be electrically controllable, for example, such as by an electrical connection through a suitable controller to the control circuit 34.

In the preferred operation, as soon as during the back stroke of the punch in the direction of arrow 13, the end edge of punch 1 disengages from the surface 20 of workpiece 4, the circuit of the relay is interrupted so that contacts 10 will be closed to supply current to drive motor 11 or other control device for the workpiece advance. The device 11, therefore, may also comprise a control device connectable to the clamping sleeve 17 and, upon actuation thereof, the clamping sleeve 17 will be united with punch 1 so that they both move upwardly to compress spring 16. During the working stroke in the direction of arrow 15, the punch, with the clamping sleeve, move downwardly, and as soon as the lower end of the clamping sleeve reaches a position indicated by the dot-and-dash line 21 in FIG. 1, the contacts of a switch 22, which are also connected in the circuit of the control device 11, are opened. At this instance, of course, the free end of punch 1 is still spaced from surface 20 of workpiece 4 by a distance corresponding to the distance 23 measured between sleeve 17 and a fixed stop 19 arranged in the path of movement of the sleeve. Simultaneously, switch 22 causes the clamping device to respond and to release the connection between clamping sleeve 17 and punch 1. Thus, punch 1 can continue its stroke in the direction of the arrow 15 by moving through sleeve 17 and nibble away a chip of workpiece 4. A new working cycle starts with the following back stroke 13.

Switch 22 may be actuated mechanically, electrically or in any other manner. It may be designed, for example, as a proximity switch which is responsive to a sufficiently small and adjustable distance between the lower end of the clamping sleeve and the associated surface of the fixed stop 19. If a so-called reed contact is used for switch 22, sleeve 17 may be provided, at its underside, with a permanent magnet 24 for effecting actuation of the contact.

It is evident that the location at which clamping sleeve 17 is clamped to punch 1 depends on the thickness of the workpiece 4 in each case. The sleeve is clamped nearer to the free end of the punch, the thicker the workpiece becomes and, inversely. Due to this arrangement, the maximum running time of the drive motor for the workpiece advance is adjusted automatically as a function of the workpiece thickness.

Figures 2, 3:
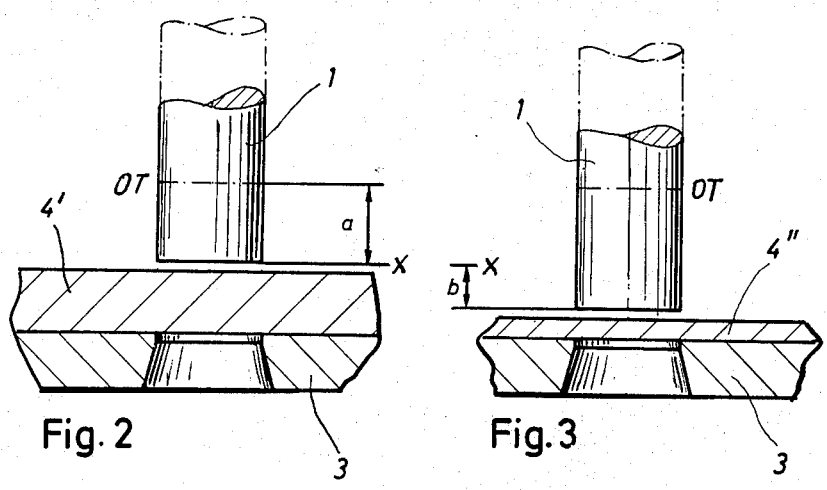
FIG. 2 is a partial view, similar to FIG. 1, showing the device used with a thicker workpiece.
FIG. 3 is a view, similar to FIG. 2, showing the same punch used with a thinner workpiece.

In FIGS. 2 and 3, the conditions are diagrammatically illustrated for different thicknesses of the sheet metal. The stroke distance which can be covered by the punch 1 from the upper dead center position indicated by the line OT to the response of the switch 22 is designated $a$. The distance $a$ is measured down to the lowermost point of the bottom of punch 1 designated X. Distance $b$ indicates the additional travel of the punch from position X downwardly to accommodate the thinner workpiece 4''. FIGS. 2 and 3 are intended to show that the control circuit must be set to accommodate for the additional running time or the shorter running time, as the case may be, depending on whether a thick workpiece 4' or a thin workpiece 4'' is used.

Instead of a control device 11, which includes either a drive motor or similar mechanical device, it may comprise an electrical control. In such a case, the position of punch 1 as it engages and disengages from the workpiece is detected, and the level of this position is higher when a thicker work-piece is operated upon. With a control device of this nature, a first signal may be generated by contact of the workpiece by the tool and a second signal may be produced when the tool returns to a top dead center position. The period of time elapsed between the first and second signals is then electrically or electronically shortened by a predetermined value corresponding to the distance indicated at 23 in FIG. 1. The period of time thus shortened determines the swtich-off instant for the workpiece advance. The position of punch 1, at its emersion from workpiece 4 and at the upper dead center point, may be sensed mechanically or by means which sense without contact. In particular, it is possible and provided to use the signal of relay 9 for the start of the on period.

The invention machine offers the great advantage of taking into account the actually effected stamping operations and not only the strokes of the punch. At the control of the advance drive, the sheet thickness is always taken into consideration. The arrangement is even such that the machines makes the switching on of the advance drive dependent upon the presence of the workpiece. This, of course, also applies if, for example, the actual stamping operations are to be counted.

While specific embodiments of the invention have been shown and described in detail to illustrate the application of the principles of the invention, it will be understood that the invention may be embodied otherwise without departing from such principles.

What is claimed is:

1. A machine operable on a workpiece which is electrically conductive, particularly a stamping, nibbling and similar machine, comprising a movable electrically conductive tool which is movable into and out of engagement with a workpiece, an electrical control circuit for said tool including a relay having a normally closed contact, means biasing said normally closed contact to a closed position, said circuit having first and second spaced apart contact terminals, said first contact terminal being engaged with said work tool, said second contact terminal being engaged with the workpiece, said relay being energized by completion of said circuit by engagement of the workpiece with the tool to open said normally closed contact, and a control device in said electric circuit for starting and stopping a control operation during the closing and opening of said contact.

2. A machine according to claim 1, wherein said control device comprises a drive motor for advancing the workpiece.

3. A machine according to claim 2, wherein said drive motor has a time-controlled contact-breaking device.

4. A machine according to claim 1, including means associated with said relay for controlling the action of said biasing means to open said contact.

5. A machine according to claim 1, wherein said control device includes a clamp engageable and disengageable from said tool, spring means biasing said clamp in a direction toward the work piece and means responsive to closing of said contact to engage said clamp with said tool during reciprocation thereof and means in the path of movement of said sleeve for detecting an end position of movement thereof.

6. A machine according to claim 1, wherein said tool has a detachable clamping sleeve therearound, said control device being connected to said sleeve to engage and disengage said sleeve with said tool, a fixed member in the path of movement of said sleeve with said tool in a direction toward said workpiece, means on said fixed member for sensing the approach of said sleeve and for regulating the movement of said workpiece thereby to a predetermined movement distance, and a drive motor for feeding the workpiece being part of said control device and being operable by said relay contact and said position-sensing device for feeding the workpiece, and a spring biasing said sleeve in a direction toward the workpiece, said sleeve being movable against said biasing means during the return stroke movement.

7. A machine according to claim 6, including a switch mounted on said fixed member comprising a proximity switch, said sleeve having an actuating member associated with said control device for operation said control device when said sleeve comes close to said proximity switch.

8. A machine according to claim 6, wherein said fixed member defines a fixed stop engageable with said sleeve and a proximity switch on said fixed stop engageable by said sleeve to stop the operation of said tool when said sleeve approaches said stop.

* * * * *